United States Patent [19]

Chiu et al.

[11] 4,196,220

[45] Apr. 1, 1980

[54] SMOKE COLORED FOOD CASING AND METHOD OF PRODUCING SAME BY USE OF LIQUID SMOKE AND AN ALBUMIN

[75] Inventors: Herman S. Chiu; George E. Smith, both of Chicago, Ill.

[73] Assignee: Union Carbide Corporation, New York, N.Y.

[21] Appl. No.: 904,284

[22] Filed: May 9, 1978

[51] Int. Cl.² .................... A22C 13/00; A23L 1/232
[52] U.S. Cl. .................................... 426/105; 426/135; 426/138; 426/140; 426/650; 426/652; 426/250; 426/540
[58] Field of Search ............. 426/133, 135, 138, 302, 426/314, 315, 235, 533, 646, 650, 277, 651, 330, 429, 425, 652, 310, 105, 250, 540

[56] References Cited

U.S. PATENT DOCUMENTS

| | | | |
|---|---|---|---|
| 3,360,383 | 12/1967 | Rose et al. | 426/302 X |
| 3,427,169 | 2/1969 | Rose et al. | 426/135 X |
| 3,467,527 | 9/1969 | Wistreich | 426/646 X |
| 3,873,741 | 3/1975 | Melcher et al. | 426/314 X |

*Primary Examiner*—Jeanette M. Hunter
*Attorney, Agent, or Firm*—Fred Ian Nathanson

[57] ABSTRACT

A tubular food casing is treated with an admixture of an albumin and a modified liquid smoke to provide a casing that is suitable for imparting smoke flavor and intensified smear resistant smoke color to food products processed therein. Alternatively, a casing is treated first with an albumin and then with a modified liquid smoke.

51 Claims, No Drawings

SMOKE COLORED FOOD CASING AND METHOD OF PRODUCING SAME BY USE OF LIQUID SMOKE AND AN ALBUMIN

This invention relates to methods of treating a food casing and also relates to the resultant improved treated casing, which is suitable to impart smoke flavor and intensified smear resistant smoke color to food products processed therein.

In particular this invention relates to a method of coating a fibrous or non-fibrous regenerated cellulose tubular food casing and the resultant casing, which method encompasses coating the internal surface of the casing with an admixture of an albumin such as egg albumin, and a modified liquid smoke, to provide a casing which is suitable to impart smoke flavor and intensified smear resistant smoke color to food products processed therein.

An alternative embodiment of the invention is to first coat the internal surface of the casing with an albumin, such as egg albumin, and then coat the internal surface of the casing with a modified liquid smoke, to provide a casing which is suitable to impart smoke flavor and intensified resistant smoke color to food products processed therein.

This invention also relates to collagen casing treated by the methods of this invention.

Tubular food casings are used extensively for processing a great variety of meat products and other food items. The food casings are generally thin-walled tubing of various diameters prepared by methods well known in the art from reconstituted materials, and particularly cellulose derivatives such as regenerated cellulose, and cellulose ethers, such as hydroxyethyl cellulose. Cellulosic food casings may also be prepared with fibrous web embedded in the wall thereof, such casings commonly being referred to as "fibrous food casings." Edible food casings may be prepared from collagen and are known as "collagen casing." Typical processes for the production of collagen casing are disclosed in U.S. Pat. Nos. 3,551,535 issued Dec. 29, 1970 and 3,782,977 issued Jan. 1, 1974 each to W. E. Henderson et al and U.S. Pat. No. 3,956,512 issued May 11, 1976 to T. E. Higgins.

The many different recipes and modes of processing that are used by the processed food industry to suit different tastes and even regional preferences generally necessitates the use of food casings with a variety of characteristics. In some instances, for example, food casings are required to have multifunctional uses wherein they serve as containers during the processing of a food product encased therein and then also serve as a protective wrapping for the finished product. In the processed meat industry, however, the food casings, especially those derived from cellulose, used in the preparation of many types of meat products, such as various types of sausages, beef rolls, hams and the like, are frequently removed from about the processed meat product prior to slicing and/or final packaging.

Surface appearance is an important factor in the commercial and consumer acceptance of most processed meat products, and a common feature of most varieties of such products involves the use of "smoking" for imparting a characteristic flavor and brown color thereto. In the past, the smoking of food products was generally accomplished by the food processors subjecting the food product to actual contact with smoke in a gaseous or cloud-like form. Such smoking processes, however, have not been considered very satisfactory for a variety of reasons including the inconvenience, inefficiencies and lack of uniformity of the "smoking" operation. Because of the shortcomings experienced, the trend has been to employ various types of liquid aqueous solutions of smoke commonly called "liquid smoke solutions", or "as is" liquid smoke, that have been developed and used commercially by the food processor in the processing of many types of meat and other food products.

The application of "liquid smoke solutions" to meat products is generally carried out in a variety of ways, including spraying or dipping an encased food product during the processing thereof or by incorporating the "liquid smoke solution" in the recipe itself. The actual operation of "smoking" by spraying or dipping is not completely satisfactory due to the equipment expenses and the limited degree of control that has been found, and incorporation of "liquid smoke solutions" in the meat recipe does not always provide the desired surface appearance because of dilution of smoke ingredients.

It has also been suggested, as for example, in U.S. Pat. No. 3,330,669 to Hollenbeck, that application of a viscous liquid smoke solution to the inside surface of a tubular food casing by the food processor prior to the stuffing thereof with a sausage emulsion results in preparation of processed food products that exhibit good color and smoky flavor after cooking and removal of the casing.

The Hollenbeck coating, however, is not smear resistant. The Hollenbeck coating can be easily removed from a moist sausage surface when and after a casing is peeled off. The thickening agents which Hollenbeck employs do not contribute color to the casings and by their presence even dilute the color. Thus, the Hollenbeck process is not practical and it is not used commercially.

Heretofore, however, it has been found that providing casings to afford special treatment or structural characteristics to the food product can be more uniformly and economically accomplished by the casing manufacturer. This is especially true with the advent and wide commercial use of automatic stuffing and processing equipment in the processed food industry.

Several methods of providing food casings with coating applied to a surface thereof are known and described in the patent literature. There is disclosed, for example, in U.S. Pat. No. 3,451,827 a spraying method for applying a variety of coating materials over the internal surface of small diameter casing and in U.S. Pat. No. 3,378,379 to Shiner et al, a "slugging" method used for applying coating materials to the internal surface of large diameter casings. While such techniques and others have been used in preparing commercial quantities of coated food casings, the casings prepared thereby are, in general, used to meet particular commercial requirements and to the best of our knowledge none of the coated casings disclosed in the art are satisfactory for imparting smear resistant smoke color or specifically intended to impart smear resistant smoke color to a meat product processed therein. In U.S. Pat. Nos. 3,360,383 to Rose et al, and 3,383,223 and 3,617,312 to Rose, for example, are disclosed coating compositions, that employ liquid smoke solutions in amounts that are specifically required to react with and insolubilize a protein material, such as gelatin, which are used to prepare casings that meet special adhesion properties required for use in the processing of dry sausages, which properties would therefore limit the suitability thereof for other casing applications.

Preparation of tubular food casings that could be used in the manufacture of a variety of processed food products and that would impart smoke flavor and smear resistant smoke color to the processed product would be highly desirable. Especially advantageous would be food casings that could be prepared using conventional coating methods and that would impart a desired smoke flavor and smear resistant color to products that have the casing removed prior to final packaging or eating.

Brown dyes, such as chocolate Brown HT, have been considered for casing treatment, but such dye is not considered safe for human consumption. A smoke color dye mixture, such as Stange's smoke color, can be used to give a superficial smoke color to meat products, but, because it is a dye mixture of primary red and blue dyes, which have differing solubility and diffusivity, the surface coloration of the meat products becomes bluish as the red dye diffuses into the meat product with storage. Thus, this separable smoke color is not a satisfactory coloring agent.

While the use of a liquid smoke for food products treatment to give the appearance and flavor similar to those obtained with natural smoke is well-established art, its use for casing treatment whereby the smoke constituents are transferred from the casing to the meat surface has not, heretofore, met with any commercial success. Hollenbeck, in U.S. Pat. No. 3,330,669, uses water soluble thickening agents such as methocel, guar gum, gelatin, and pre-gelled starch or fats and oils to thicken a liquid smoke solution to be used for coating prior to a stuffing operation. However, this has not been found entirely satisfactory as explained previously, in that whatever color is transferred to the meat surface may rub off. Therefore it is desired to provide a treated food casing which can impart smoke flavor and smear resistant smoke color to the surface of a meat product processed in the treated casings.

As is well-known, commercially available liquid smoke solutions are highly acidic, generally having a pH of 2.0 to 2.5, though some commercial products are supplied in partially neutralized form with a pH of 4.5 to 5.0, and as disclosed in U.S. Pat. No. 3,467,527 to Wistreich, an oil extract of liquid smoke solution may be provided having a pH in the range between 5.5 and 8.5. The highly acidic nature of aqueous liquid smoke solutions has, heretofore, been essential to maintain all the smoke flavor and/or color constituents in solution, since neutralization to a pH greater than about 5 results in the insolubilization and separation of some of the important constituents thereof.

The problems of using highly acidic materials in conjunction with cellulosic materials have been studied over the years and the detrimental effects thereof on the cellulose polymeric structure, which generally results in a loss of strength, is well known. It has been found that such effects are also prevalent with cellulosic food casings which adds to the general undesirability of using highly acidic materials with food products. It is known, for example, that while manufacturing procedures generally employed in the preparation of food casings involves treatment with highly acidic materials, extensive washing and neutralization treatments are used to assure that the casings are in a substantially neutral condition when packaged for storage or for shipment to a food processor.

Preparation of tubular food casings that could be used in the manufacture of a variety of processed food products and that would impart a desired smoke color and flavor to the processed food product would be highly desirable. Therefore, development of a liquid smoke suitable for use in the preparation of such casings would be most advantageous, particularly if it was provided in a generally neutral condition, and thereby avoids the disadvantages associated with the use of highly acidic materials with cellulosic food casings and with food products generally.

Commercially available liquid smoke solutions, in addition to being highly acidic, also contain rather low concentrations of smoke flavoring and coloring constituents which are kept in solution by the highly acidic nature of the aqueous liquid smoke solution. At these low levels of concentration, commercially available liquid smoke solutions, on being used to coat food casing such as in a conventional squeeze roll set-up or in a conventional doctor roll set-up, do not provide sufficient smoke flavoring and coloring constituents to the casing surface for transfer to the surface of a meat product which is subsequently stuffed in the casing. Acceptable smoke flavor and color is not developed in the encased meat product. In addition, if a commercially avaiable liquid smoke solution is coated on a casing by spraying, excessive amounts of water may be added to the casing.

Hollenbeck, in U.S. Pat. No. 3,330,669 noted above, teaches thickening commercially available "as is" liquid smoke solutions with water soluble gums for coating food containers and casings. Because of the much higher viscosity of the coating solution, as compared with the commercially available "as is" liquid smoke solution, it is then possible to form a thick layer of coating on the casing surface by slugging, whereby the flavoring and coloring level is increased to a noticeable extent. Even employing such a technique, the casing will not retain the required amount of smoke flavoring and coloring constituents, if the casing passes through squeeze rolls during drying of the casing in an inflated condition. It would be advantageous to modify the concentration of the liquid smoke constituents in solution, in order to provide a concentrated liquid smoke which could be used in a coating operation such as one which employs squeeze rolls rather than to modify the viscosity of the "as is" liquid smoke as taught by Hollenbeck.

Dry smoke flavoring powders obtained by spray-drying liquid smoke solutions in a malto-dextrin carrier are commercially available and a concentrated aqueous liquid smoke solution can be prepared therefrom, but such concentrated solutions are undesirably too sticky and unsuitable for coating casing, because of excessive blocking of the casing and because of jamming on the shirring mandrel due to friction, if the casing is shirred.

Preparation of tubular food casings that could be used in the manufacture of a variety of processed food products and that would impart a desired level of smoke color and flavor to the processed food product would be highly desirable. Therefore, development of a liquid smoke suitable for use in the preparation of such casings would be most advantageous, particularly if it was provided in a concentrated and less acidic condition, thereby avoiding the disadvantages associated with the use of less concentrated and highly acidic materials with cellulosic food casings and with food products generally.

The concentration of commercially available liquid smoke solutions by evaporation in "as is" condition is not satisfactory, because it yields a final concentrated solution which is still highly acidic. Such a concentrated solution is not suitable for casing treatment, because its acidity can cause cellulose degradation upon heating or prolonged storage. In the practice of the present invention, this problem is overcome by adding a sufficient amount of a water soluble solubilizing agent to the "as is" liquid smoke solutions before evaporating to conentrate. When this is done, the liquid smoke solution can be concentrated, such as by boiling, to as much as one-fifth of its original volume without solid precipitation and the resultant composition has a pH in the range of about 4 to 5, because an appreciable amount of the acidic constituents are vaporized off at higher evaporation temperatures. The pH of this resultant composition, if desired, can then be further adjusted to a desired higher pH with an alkaline neutralizing agent.

Alternatively, in the practice of the present invention, the initial "as is" highly acidic liquid smoke solution can be substantially neutralized first with an alakline neutralizing agent in the presence of a water soluble solubilizing agent and then the substantially neutralized liquid smoke composition is concentrated by evaporation at room temperature or at an elevated temperature to from about one-third to about one-fifth of its original volume.

Alternativeiy, a concentrated solution of smoke constituents can be prepared without the need of evaporation. In this embodiment of the present invention, the "as is" acidic liquid smoke solution is substantially neutralized with an alkaline neutralizing agent, without the prior addition of a water soluble solubilizing agent. When such a substantially neutralized liquid smoke composition is allowed to stand, smoke tars will settle out at the bottom of the composition and can be separated therefrom by decantation or other suitable means, such as filtration or centrifugation. The smoke tars are then dissolved in a water soluble solubilizing agent, and if desired, diluted with other additives for processing use.

It has now been found in the practice of the present invention that the use of an albumin, such as egg albumin and a modified liquid smoke for casing treatment provides a smoke flavor and an intensified smear resistant smoky brown color coating on the surface of a meat product processed in the treated casing.

H. J. Rose et al in the U.S. Pat. Nos. 3,360,383 and 3,427,169 coat a casing used in the preparation of dry sausages with egg albumin insolubilized by unmodified liquid smoke, in order to provide a cellulosic casing which more uniformly adheres to a dry sausage emulsion and more uniformly follows the shrinkage of the dry sausage during curing and drying. M. N. O'Brien in U.S. Pat. No. 3,645,760 crosslinks egg albumin with unmodified liquid smoke to provide a coating for the fibrous reinforcing material used in fibrous cellulose casing. Neither Rose el al nor O'Brien disclose the use of egg albumin to provide smear resistance to a modified or unmodified liquid smoke color and neither Rose et al nor O'Brien disclose that liquid smoke is used to impart color or flavor to food products processed in their casings. Nor do they disclose intensification of smoke color. Both Rose et al and O'Brien are concerned with adhesion only.

The deficiencies of the prior art smoke coloring agents have been overcome by the present invention, which provides a treated casing, which is capable of providing a less acidic, non-toxic, safe and stable smoke flavor and smear resistant intensified smoke color to the surface of a meat product processed in the treated casing.

In accordance with the present invention there is provided a tubular food casing that is suitable to impart smoke flavor and intensified smear resistant smoke color to the surface of food products processed therein, comprising a tubular cellulosic food casing having a coating on an internal surface thereof, of an admixture of an albumin such as egg albumin, and a modified liquid smoke defined more fully hereinafter, in amounts specified in more detail hereinafter. In an alternative embodiment of the present invention the casing has a coating on an internal surface thereof, of a first layer of an albumin, such as egg albumin and a second layer of modified liquid smoke, in amounts specified in more detail hereinafter. It has been discovered that the tubular food casings of the present invention may be used to impart smoke flavor and intensified smear resistant smoke color to a wide variety of meat products processed therein without the need for any further smoking operations by the food processor. Moreover, it has been found that said casing may be prepared in the form of shirred casing sticks wherein long continuous lengths of tubular food casing are pleated and compressed into a substantially shortened form thereof, or as short segments of flattened tubing.

Also provided in accordance with the present invention are tubular collagen food casings treated by the methods of this invention. Smoke flavored and colored collagen casings of this invention are capable of imparting smoke flavor and intensified smear resistant smoke color to food products, such as meat products, processed therein. This is particularly applicable to inedible collagen casings because there casings are removed from the food product. However, in the practical use of edible collagen casing once the food product is encased therein, the casing is not removed before human consumption, but is consumed with the encased meat product. Therefore, transfer of the smoke flavor and color from an edible collagen casing to the surface of the encased food product surface is not critical, because in normal use, unlike in the use of peelable cellulosic casings, the consumer will not remove the casing prior to consumption. However, transfer of smoke color and flavor from an inedible collagen casing to an encased food product is critical since the inedible casing must be removed before consumption.

Also provided in accordance with the present invention are methods of preparing tubular food casings that are suitable for imparting smoke flavor and intensified smear resistant smoke color to food products processed therein which comprises in one embodiment, hereinafter referred to as the "one step method," providing a tubular food casing and applying to an internal surface thereof an admixture of an albumin, such as egg albumin, and a modified liquid smoke. In an alternative embodiment of the present invention, hereinafter referred to as the "two step method", the casing is coated on its internal surface with a first layer of an albumin, such as egg albumin, and then with a second layer of a modified liquid smoke.

The term "modified liquid smoke" as used herein is intended to encompass the terms "substantially neutralized liquid smoke", "concentrated liquid smoke", "concentrated substantially neutralized liquid smoke", and "smoke tars liquid smoke" individually or in mixtures thereof.

Tubular food casings that are suitable for use in the casings of the present invention are tubular casings and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like in a variety of diameters. Also suitable are tubular cellulosic casings having a fibrous reinforcing web embedded in the wall thereof which are commonly called "fibrous food casings", as well as cellulosic casings without fibrous reinforcement, and casings prepared from reconstituted materials such as collagen and the like. Also suitable are cellulose ether and polyvinyl alcohol casings either fiber reinforced or nonfibrous.

For use in the embodiments of the present invention there is provided an aqueous modified liquid smoke composition hereinafter referred to as "concentrated substantially neutralized liquid smoke", that is in a substantially neutralized and concentrated condition, having a pH greater than about 4, and that is suitable to impart smoke color and flavor characteristics to a cellulosic food casing and to food products processed therein, comprising an aqueous solution of at least about 15% by weight of smoke coloring and flavoring constituents, a salt of an alkaline neutralizing agent, and an amount of a water soluble solubilizing agent such as a water soluble short carbon chain alcohol, sufficient to maintain said smoke constituents in solution. It has been discovered that the concentrated substantially neutralized liquid smoke solution may be applied to the surface of a cellulosic food casing in an amount that will be suitable for imparting smoke flavor and color characteristics to said food casing and to a wide variety of meat products processed therein.

A method of preparing concentrated substantially neutralized liquid smoke compositions having a pH of greater than about 4 that may be used in the preparation of tubular cellulosic food casings, encompasses substantially neutralizing a "liquid smoke solution" with an alkaline neutralizing agent to a pH greater than about 4 in the presence of an amount of a water soluble solubilizing agent, such as a water soluble short carbon chain alcohol, that is sufficient to maintain the smoke coloring and flavoring constituents in solution, and then concentrating the substantially neutralized liquid smoke by evaporation at room temperature or at elevated temperatures.

For use in the embodiments of the present invention there is also provided an aqueous modified liquid smoke composition hereinafter referred to as "concentrated liquid smoke", that is in a generally concentrated condition having a pH greater than about 4, and that is suitable to impart smoke color and flavor characteristics to a cellulosic food casing and to food products processed therein, comprising an aqueous solution of at least about 15% by weight of smoke coloring and flavoring constituents, and a water soluble solubilizing agent, preferably a water soluble short carbon chain polyhydric alcohol having a boiling point of at least about 130° C. in an amount sufficient to maintain said smoke constituents in solution. It has been discovered that the concentrated liquid smoke solution may be applied to the surface of a cellulosic food casing in an amount that will be suitable for imparting smoke flavor and color characteristics to said food casings and to a wide variety of meat products processed therein.

A method of preparing concentrated liquid smoke compositions having a pH of greater than about 4 that may be used in the preparation of tubular cellulosic food casings encompasses admixing a "liquid smoke solution" with an amount of a water soluble solubilizing agent, preferably a water soluble short chain polyhydric alcohol having a boiling point of at least about 130° C., that is sufficient to maintain the smoke coloring and flavoring constituents in solution and then concentrating the solution such as by evaporation at elevated temperatures by boiling.

An alternative method for preparing a "concentrated substantially neutralized liquid smoke" is to adjust the pH of the concentrated liquid smoke to a higher pH with an alkaline neutralizing agent.

For use in the embodiments of the present invention there is also provided an aqueous liquid smoke composition hereinafter referred to as "smoke tars liquid smoke" that is in a substantially neutralized and concentrated condition, having a pH greater than about 4, and that is suitable to impart smoke color and flavor characteristics to a cellulosic food casing and to food products processed therein, comprising a solution of at least about 15% by weight of smoke coloring and flavoring constituents derived from smoke tars, and an amount of a water soluble solubilizing agent sufficient to maintain said smoke constituents in solution. It has been discovered that the smoke tars liquid smoke solution may be applied to the surface of a cellulosic food casing in an amount that will be suitable for imparting smoke flavor and color characteristics to said food casing and to a wide variety of meat products processed therein.

A method of preparing smoke tars liquid smoke compositions having a pH of greater than about 4 that may be used in the preparation of tubular cellulosic food casings encompasses substantially neutralizing a "liquid smoke solution" with an alkaline neutralizing agent, separating precipitated smoke tars from the substantially neutralized composition, and then dissolving the smoke tars in a water soluble solubilizing agent.

Concentrated liquid smoke, concentrated substantially neutralized liquid smoke, and smoke tars liquid smoke compositions are also described in U.S. Application Ser. No. 904,283 to H. S. Chiu, filed May 9, 1978 concurrently with this application.

A "substantially neutralized liquid smoke" composition suitable for use in this invention is described in U.S. Application Ser. No. 783,425 to H. S. Chiu, filed Mar. 31, 1977 now U.S. Pat. No. 4,104,408, wherein in accordance with the invention disclosed and claimed therein, there is provided an aqueous liquid smoke composition that is in a generally neutralized condition, having a pH greater than 5, and is suitable to impart smoke color and flavor characteristics to a cellulosic food casing and to food products processed therein comprising a uniform mixture, and preferably an aqueous solution of smoke coloring and flavoring constituents an alkaline neutralizing agent in an amount sufficient to maintain the solution at a pH greater than 5, and an amount of a short chain alcohol solubilizing agent sufficient to maintain said smoke constituents in solution. The substantially neutralized aqueous liquid smoke solution, as disclosed in the aforementioned application, may be applied to the surface of a cellulosic food casing in an amount that will be suitable for imparting smoke flavor and color characteristics to the food casing and to a wide variety of meat products processed therein. However, for use in the embodiments of the present invention the pH of the substantially neutralized liquid smoke can be greater than about a pH of 4.

The invention of the aforementioned application further provides a tubular food casing that is suitable to impart smoke flavor and color to food products processed therein comprising a tubular cellulosic food casing having a coating over a surface thereof comprising an admixture of smoke coloring and flavoring constituents in an amount of at least about 0.1 mg/in$^2$, and preferably at least about 3 mg/in$^2$, of casing surface, an alkaline neutralizing agent, and a short chain alcohol solubilizing agent for said smoke constituents. It is disclosed in the application that the tubular food casing of the invention disclosed therein, will not be degraded during extended periods of storage by the presence of liquid smoke constituents on the surface thereof, and, further, that such casings may be prepared in the form of shirred casing sticks, as short segments of flattened tubing, and the like.

Also provided in that application is a method of preparing substantially neutralized aqueous liquid smoke compositions having a pH of greater than 5 that may be used in the preparation of tubular cellulosic food casings comprising neutralizing a "liquid smoke solution" with an alkaline neutralizing agent in the presence of an amount of a short chain alcohol solubilizing agent that is sufficient to maintain the smoke coloring and flavoring constituents in solution.

The term "substantially neutralized" as used herein is intended to refer to compositions having a pH within the range of about 4 to about 8. Preferably, such compositions have a pH within the range of about 6 to about 8.

The term "smoke tars" as used herein encompasses the precipitate separated from an aqueous liquid smoke substantially neutralized in the absence of a sufficient amount of a solubilizing agent to maintain the smoke tars in solution.

The term "solution" as used herein is meant to encompass homogeneous true solutions, emulsions, colloidal suspensions, and the like. The term "solution" is not meant to encompass the "smoke tars" precipitate.

The coating compositions of an albumin and a modified liquid smoke individually or admixed, together which are prepared by the methods of this invention are preferably homogeneous solutions, but emulsions, and colloidal suspensions are also suitable and the term solution is also used herein to encompass the latter.

It has been found that the present invention which provides a smoke flavoring and coloring composition comprising an albumin, such as egg albumin, and a modified liquid smoke can overcome the deficiencies of the prior art smoke flavoring and coloring agents. Egg albumin reacts with the modified liquid smoke according to the well-known "Browning" reaction resulting in an "intensified" and appealing smoky brown color. Furthermore, egg albumin being heat coagulable, becomes insolubilized at conventional meat processing temperatures, forming a protective coating on the outer surface of the processed sausage which gives the surface of the sausage a smear-resistant intensified brown smoke color.

Smoke coloring and flavoring constituents suitable for use in accordance with the present invention are generally those designated as being the coloring and flavoring constituents of "liquid smoke" which is a well known class of materials also commonly referred to as "liquid smoke solutions" or "as is" liquid smoke. Various "liquid smokes" are known, all of which are believed suitable for use in the present invention.

Liquid smoke often is a solution of natural wood smoke constituents prepared by burning a wood, for example, a hickory or a maple, and capturing the natural smoke constituents in a liquid medium such as water. Alternatively the liquid smoke to be used may be derived from the destructive distillation of a wood, that is, the breakdown or cracking of the wood fibers into various compounds which are distilled out of the wood residue. Liquid smokes are generally very acidic, usually having a pH of 2.5 or less and a titratable acidity of at least 3%, although some partially neutralized liquid smokes, having a pH up to about 5, are also available. Reference to the term "smoke coloring and flavoring constituents," as used throughout this specification and in the appended claims with respect to the modified liquid smoke compositions and casings of the invention, is intended to refer to and should be understood as referring to, the smoke coloring and flavoring constituents derived from liquid smoke solutions in their present commercially available form. The term "smoke flavoring and coloring constituents", as used herein, is intended to be synonymous with the term "smoke solids", which is the term commonly used by the suppliers of commercial liquid smokes.

The liquid smoke that is preferred for use with this invention is a solution of natural wood smoke constituents. This liquid smoke is produced by the limited burning of hardwoods and the absorption of the smoke so generated into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood constituents are absorbed into the solution in a balanced proportion and the undesirable constituents may be removed. The resultant liquid smoke solution is representative of the whole preferred spectrum of smoke colors and flavors without a preference of any one type. The apparatus and method for manufacturing typical liquid smokes of the preferred type is more fully described in U.S. Pat. Nos. 3,106,473 to Hollenbeck and 3,873,741 to Melcer et al.

Certain liquid smokes have been approved for use in foods by the U.S. Food and Drug Administration and the Meat Inspection Division of the U.S. Department of Agriculture. Exemplary of suitable commercially available liquid smokes are CHARSOL from Red Arrow Products Co.; LIQUID HICKORY SMOKE from Hickory Specialties, Inc.; GRIFFITH'S NATURAL SMOKE FLAVOR from Griffith Laboratories, Inc.; and SMOKAROMA LIQUID SMOKE CODE 10 from Meat Industry Suppliers, Inc. Also suitable is an aqueous liquid smoke such as disclosed in U.S. Pat. No. 3,117,007 to Hollenbeck. The invention is not limited to those liquid smokes specified herein, but may include others selected by those skilled in the art. The liquid smokes may be used individually or as mixtures of various liquid smokes.

Smoke coloring and flavoring constituents suitable for use in accordance with the invention are those known constituents of commercially available "liquid smokes" that afford smoke flavor and/or color characteristics to various types of food products. Various "liquid smokes", as herein above described, are known and all of these are believed suitable for use in the invention. The modified liquid smoke compositions herein described may be advantageously employed as a source of suitable smoke coloring and flavoring constituents.

Alkaline neutralizing agents suitable for use in accordance with the invention are any of the well known water soluble alkaline materials such as, for example, potassium hydroxide, sodium hydroxide, ammonium hydroxide, sodium carbonate, sodium bicarbonate, sodium phosphate, disodium hydrogen phosphate, and the like. The alkaline materials may be in solid form or as a concentrated solution thereof. The most highly alkaline materials are most advantageously employed in order that the concentration of smoke constituents will be maintained as high as possible in a substantially neutralized solution thereof.

Among suitable water soluble solubilizing agents for use in accordance with the invention are short chain monohydric and polyhydric alcohols that are water soluble, non-toxic, and preferably are approved for use in a food related application. Exemplary of suitable materials are ethyl alcohol, glycerine, propylene glycol, triethylene glycol and the like.

If used in an embodiment of the invention, the amount of alkaline neutralizing agent employed in an aqueous solution of smoke constituents is largely determined by the acidity and composition of the particular liquid smoke solution that is initially employed and the method of concentration.

The amount of a water soluble solubilizing agent that is employed in the embodiments of this invention is largely determined by the composition of the particular liquid smoke that is used, the desired pH, and the extent of concentration of the modified liquid smoke compositions of the invention, but, in general the solubilizing agent will be present where employed in an amount sufficient to keep the smoke constituents in solution. In the preparation of either a concentrated substantially neutralized liquid smoke composition or a concentrated liquid smoke composition the amount of a water soluble solubilizing agent that should be present is at least about 11% by weight of the "as is" liquid smoke solution initially employed, and at least about 30% by weight of the final concentrated liquid smoke or concentrated substantially neutralized liquid smoke.

In the preparation of smoke tars liquid smoke composition the amount of a water soluble solubilizing agent that should be present is that amount sufficient to dissolve the smoke tars. The amount of solubilizing agent that may be present in excess of that actually required may vary over a wide range, but it is generally desirable that the smoke coloring and flavoring constituents should be in as high a concentration as possible and amounts of solubilizing agent greatly in excess of that actually required would unnecessarily dilute the concentration thereof.

The substantially neutralized aqueous liquid smoke compositions suitable for use in the present invention are, in general, prepared by admixing a sufficient amount of a water soluble solubilizing agent with a liquid smoke solution and then admixing an alkaline neutralizing agent therewith until a desired pH is attained. In an alternative, but not as advantageous, procedure, the compositions may be prepared by first neutralizing the liquid smoke to the desired pH and then admixing therewith an amount of a water soluble solubilizing agent sufficient to obtain a clear solution thereof.

The aqueous concentrated substantially neutralized liquid smoke compositions are, in general, prepared by admixing a sufficient amount of a water soluble solubilizing agent with a commercially available "as is" liquid smoke solution and then admixing an alkaline neutralizing agent therewith until a desired pH of greater than about 4 is obtained, preferably a pH between about 6 and about 8, and then concentrating the substantially neutralized composition by evaporation at room temperature or at elevated temperatures down to from about one-third to about one-fifth of the original volume.

Alternatively, the concentrated substantially neutralized liquid smoke composition may be prepared by adding an alkaline neutralizing agent to a concentrated liquid smoke to raise its pH to a desired level. In an alternative, but not as advantageous, procedure, the concentrated substantially neutralized liquid smoke compositions of the invention may be prepared by first substantially neutralizing the liquid smoke to a desired pH and then admixing therewith an amount of a water soluble solubilizing agent sufficient to obtain a clear solution thereof, and then concentrating to desired levels.

The substantially neutralized liquid smoke composition before concentration comprises an aqueous solution with a pH greater than about 4 of the smoke coloring and flavoring constituents of aqueous "as is" liquid smoke solutions as hereinabove described, a salt of an alkaline neutralizing agent, and a water soluble solubilizing agent in an amount sufficient to prevent said smoke constituents from separating out.

The aqueous concentrated liquid smoke compositions are, in general, prepared by admixing an amount of a water soluble solubilizing agent, sufficient to keep smoke constituents in solution, with a commercially available "as is" liquid smoke solution and then concentrating preferably by boiling at elevated temperatures down to about one-third to about one-fifth of the original volume. The water soluble solubilizing agent used to prepare the concentrated liquid smoke, preferably has a boiling point of at least about 130° C. and is preferably a short chain polyhydric alcohol. Sufficient acidic components of the liquid smoke should be evaporated off in order to obtain a pH of greater than about 4. The higher the boiling point of the solubilizing agent, more of the higher boiling acidic components will be removed.

The smoke tars liquid smoke compositions are, in general, prepared by substantially neutralizing an "as is" liquid smoke solution without the prior addition of water soluble solubilizing agent, separating the smoke tars which settle out by decantation or other suitable means such as filtration or centrifugation and then dissolving the separated smoke tars in a water soluble solubilizing agent.

Various methods of concentrating by reduction of the water component of the substantially neutralized liquid smoke solution may be employed including, but not limited to vaporization by room temperature evaporation in a low humidity environment, and boiling at elevated temperature. The former method is preferred in order to avoid loss of the more volatile components. Other methods of concentration which may be employed include among others, "freeze-drying" and "spray-drying". With respect to the preparation of the concentrated liquid smoke compositions which are not substantially neutralized with an alkaline neutralizing agent before concentration, the preferred method of concentration is by boiling at elevated temperatures, because along with a reduction of the water component of the liquid smoke, volatile acidic components are also vaporized off at the elevated temperatures, thereby resulting in a less acidic concentrated liquid smoke. A method for preparing a smoke tars liquid smoke employs precipitation and decantation as already noted, but other suitable methods may be employed.

Smoke coloring and flavoring constituents suitable for use in accordance with the invention are those known constituents of commercially available "liquid smokes" that afford smoke flavor and/or color characteristics to various types of food products. Various "liquid smokes", as hereinabove described, are known and all of these are believed suitable for use in the invention. Substantially neutralized liquid smoke compositions, or the concentrated liquid smoke compositions, or the concentrated substantially neutralized liquid smoke compositions, or the smoke tars liquid smoke compositions or combinations thereof which are prepared from commercially available liquid smoke solutions, may be advantageously employed as a source of suitable smoke coloring and flavoring constituents.

The modified liquid smoke compositions other than the substantially neutralized liquid smoke composition used in the present invention generally have pH's in the range from about 4 to about 8 and smoke flavoring and coloring constituents of about 15% by weight and higher as contrasted to commercially available "as is" liquid smoke solutions which have pH's on the order of 2-2.5 and a total smoke constituents content of only about 10% and less.

The food casings of the present invention may be prepared from tubular casing well-known in the art as cellulosic or regenerated cellulose casings, either with or without fibrous reinforcement. The former is known in the trade as fibrous casing and is reinforced with paper. Other casings can be treated by the methods of this invention, such as those made from cellulose derivatives, collagen (edible and inedible), insolubilized polyvinyl alcohol (both fibrous reinforced and unreinforced) and the like.

While the invention particularly relates to tubular food casings, food wrapping materials in other forms such as sheet form may be provided by appropriate modifications of the treating methods of this invention by those skilled in the art.

Modified liquid smoke compositions suitable for use in the invention have been found to be advantageously employed as a coating material for food casings that may be used to impart smoke flavor and smear resistant intensified smoke color characteristics to a variety of food products processed therein.

The casings of this invention can be used to process meat products including, but not limited to, sausages such as frankfurters, bolognas, salamis, cervelates, Thuringers, and the like. Cheese products may also be encased in the casings of this invention.

Smoke flavor and color along with the albumin transfer from the coated casings to the surface of the encased meat product during conventional processing of the sausage and during the conventional processing the transferred albumin heat coagulates to render the smoke color transferred to the surface of the sausage smear resistant.

In accordance with the present invention there is provided a tubular food casing that is suitable to impart smoke flavor and smear resistant intensified smoke color to food products processed therein comprising a tubular cellulosic food casing having a coating of egg albumin and a modified liquid smoke. It has been discovered that the tubular food casings of the present invention may be used to impart smoke flavor and smear resistant smoke color to a wide variety of meat products processed therein without the need for any further smoking operations by the food processor. Moreover, it has been found that said casings may be prepared in the form of shirred casing sticks wherein long continuous lengths of tubular cellulosic food casing are pleated and compressed into a substantially shortened form thereof, or as short segments of flattened tubing.

In a preferred method embodiment of this invention, herein referred to as the "one-step method", a modified liquid smoke other than substantially neutralized liquid smoke is further mixed with a water soluble solubilizing agent, such as propylene glycol, glycerine, or ethyl alcohol and the like, and then to this mixture is added the proper proportion of an albumin such as an egg albumin, to give a final mixture for coating casing. The admixture is coated on the internal surface of a tubular casing having preferably a water content of at least about 25 wt. %, giving the casing a brown smoke color and then the casing is dried to desired moisture levels before a conventional shirring step. The smoke colored casing can then be stuffed with a food product such as a meat emulsion. The smoky brown color of the casing will transfer to the surface of the encased meat product, so that if the casing is separated from the encased meat after cooking or after other further processing well-known in the art, the surface of the meat will have a smear resistant intensified brown smoke color, due to the coagulated albumin protecting the smoke color.

A less preferred method embodiment of the present invention, herein referred to as the "two-step method", encompasses providing a tubular food casing and coating the internal surface of the casing with an aqueous solution of egg albumin, partially drying the casing, coating the internal surface of the casing with a modified liquid smoke solution and finally drying the casing. The amounts of coating constituents and treating conditions are specified in detail hereinafter.

Egg albumin as found in various forms is suitable for use in this invention including egg albumin as present in egg white, egg yolk, whole egg, and the like. Also suitable in place of egg albumin or in admixture therewith are serum albumin, lactalbumin, and the like.

The preferred embodiments of this invention encompass the use of egg albumin as found in egg white, such as the well-known commercially available "frozen egg white" or "Kraft's dried egg white powder, Angel Type".

In the preparation of an egg albumin solution used to coat the casing by the two-step method, an amount of water should be used which is sufficient to dissolve the egg albumin. Mineral oil and the like is optionally added to the egg albumin solution as an antiblocking agent preferably in the range of from about 2.0 wt% to about 6.0 wt% based upon the total weight of the solution. Glycerine and the like, may be added to the egg albumin solution as a plasticizing agent preferably in the range from about 5.0 wt% to about 20.0 wt% based upon the total weight of the solution. The egg albumin in the solution should be present in an amount of at least about 15.0 wt% based on the total weight of the solution.

The highly acidic commercially available liquid smoke solutions are not compatible with egg albumin, because albumins tend to precipitate in an acidic environment. The presence of water soluble solubilizing agents such as propylene glycol and glycerine and alcohols such as ethyl alcohol can render the mixture more stable. However, in the practice of this invention the use of commercially available "as is" liquid smoke solutions without raising their pH is not preferred.

The preferred level of an albumin coated on the inner surface of a casing should be that amount which is sufficient to impart smear resistance to the smoke color transferred to the surface of a meat product processed therein and should be at least about 1.5 mgs/sq.in. of casing surface.

There is provided in accordance with the present invention a tubular food casing that is suitable to impart smoke flavor and smear resistant intensified smoke color to food products processed therein, comprising a tubular cellulosic food casing having a coating over a surface thereof, comprising an admixture of an albumin in an amount of at least about 1.5 mg/in$^2$, of casing surface, and a modified liquid smoke having smoke coloring and flavoring constituents in an amount of at least about 0.5 mg of said smoke constituents per square inch, and preferably at least about 3 mg/in$^2$, of casing surface.

In accordance with the present invention, there is also provided a tubular food casing that is suitable to impart smoke flavor and smear resistant intensified smoke color to food products processed therein, comprising a tubular cellulosic food casing having a coating over a surface thereof, comprising a first layer of an albumin in an amount of at least about 1.5 mg/in$^2$ of casing surface, and a second layer of a modified liquid smoke having smoke coloring and flavoring constituents in an amount of at least about 0.5 mg of said smoke constituents per square inch, and preferably at least about 3 mg/in$^2$, of casing surface.

Selection of the amount of a modified liquid smoke to treat the casings is dependent upon the individual taste and color preferences of the consumers, some of whom would prefer a heavy smoke flavor and a dark color on their sausages while others a lighter aroma and color.

The amount of smoke constituents that should be present on the food casing of the present invention would depend on the desired flavor and/or color characteristics to be imparted to the food casing or to food products processed therein and may vary over a wide range. The amount present, therefore, is largely determined by the composition and concentration of smoke constituents in the particular "as is" liquid smoke solution initially employed, which affects the composition and concentration of the smoke constituents in the modified liquid smoke compositions, but, in general, the food casing should have coated on it at least about 0.5 mg of smoke coloring and flavoring constituents per square inch of casing surface and preferably at least about 3 mg/in$^2$. The amount of a salt of an alkaline neutralizing agent present in the coating will largely depend on the amount of the alkaline neutralizing agent used to prepare the modified liquid smoke coated on the casing. The amount of a water soluble solubilizing agent, that should be present in the coating is not critical and will depend on the amount of smoke constituents that are present.

The modified liquid smoke compositions suitable for use in the present invention may also contain other ingredients such as, for example, viscosity control agents, coating aids, and ingredients that may be suitably used in treating an article such as a tubular food casing, to which the smoke constituents will be applied.

Other ingredients which are normally used in the manufacture of, or for further treatment of the food casings, e.g., cellulose ethers, mineral oil, etc., may also be present if desired, and they will be used in the same manner and amounts as if the smoke constituent coating admixture had not been used. Also present, are other ingredients that may, for example, be used in a modified liquid smoke coating composition as viscosity control agents and the like, e.g. commercial sugars, cellulose ethers, carboxymethyl cellulose and the like.

Suitable coating compositions may also contain those ingredients that are known in the art as useful for imparting a variety of desirable characteristics to food csings, such as improved shirrability, peelability, pliability and the like.

Antiblock agents such as mineral oil and the like, may also be employed in the coatings of this invention.

Food casings of the present invention may be prepared by application of the albumin and modified liquid smoke treating agent compositions of the present invention in a one-step or two-step method to a surface of a suitable tubular food casing by using any one of a number of well known methods, such as slugging, which is also known as bubble coating (U.S. Pat. No. 3,378,379 to Shiner et al and U.S. Pat. Nos. 3,360,383 to Rose et al; 3,383,223 to Rose; and 3,427,169 to Rose et al), spraying (U.S. Pat. No. 3,330,669 to Hollenbeck) or internally coating the casing while shirring by the method disclosed by Bridgeford in U.S. Pat. No. Re. 28,281 or U.S. Pat. No. 3,451,827 to Bridgeford.

The slugging method for coating the inside of a casing involves filling a portion of the casing with the coating material, so that the slug of coating material generally resides at the bottom of a "U" shape formed by the casing draped over two parallel rollers, and then moving the continuous indefinite length of casing so that the slug of coating material remains confined within the casing, while the casing moves past the slug and is coated on its inside wall by the coating material contained within the slug.

The tubular casing is preferably coated on its inside surface. Of course, the casing may be coated on its outer wall and then turned inside-out for stuffing, if so desired.

In the well-known conventional methods for preparing regenerated cellulose (cellulosic) casing (non-fibrous or fibrous), or collagen casing, the final casing processing step is a drying step which encompasses passing the unfinished casing, commonly known as gel casing, through a hot air dryer wherein the gel casing is dried to a desired water content.

The casings prepared by the "one-step" method of this invention, may be prepared by coating dry casing, but are preferably prepared by coating gel casing or by coating gel casing partially dried to a water content, preferably, of at least about 25 wt%. The casings prepared by the "two-step" method may be prepared by coating gel or dry casing.

In the practice of the "one-step" method the casing is dried by conventional means after coating to a desired water content selected by those skilled in the art, which is dependent upon the type of casing. The drying should be carried out in a manner so as to prevent insolubilization of the albumin contained in the coating. The albumin of the coating is preferably insolubilized after it has transferred with the modified liquid smoke of the coating to the surface of the encased food product during the processing thereof, so as to render the coating transferred to the food product smear-resistant.

In the practice of the "two-step" method the casing is dried after coating with the albumin solution and then finally dried to a desired water content selected by those skilled in the art which is dependent upon the type of casing, after the coating of the modified liquid smoke is applied. Drying should be carried out in a manner so as to prevent insolubilization of the albumin in the coating on the casing.

Food casings of the present invention may be provided in any of the forms known in the art, such as in the form of shirred casing sticks, discrete short segments of flattened casings, continuous lengths of flattened casing on a reel, and the like. It has been found that such casings may be stored for extended periods of time without being structurally degraded or deteriorated by chemical action caused by the presence of liquid smoke constituents on the surface thereof, and when employed in the processing of a wide variety of food products will impart smoke flavor and smear resistant intensified smoke color to the food product without the need for other well-known smoking procedures.

The following examples are set forth as being merely illustrative of the invention and are not intended, in any manner, to be limitative thereof. Unless otherwise indicated, all parts and percentages are by weight.

EXAMPLE I

This example illustrates the preparation of a substantially neutralized liquid smoke composition.

1000 gms of "SMOKAROMA Code 10" (Meat Industry Suppliers Co.) liquid smoke is mixed with 250 gms of propylene glycol. To this solution is added 70 gms of sodium hydroxide. The final substantially neutralized liquid smoke solution has a pH of 6.2.

EXAMPLE II

This example illustrates the preparation of a concentrated liquid smoke composition.

1000 gms of "SMOKAROMA Code 10" liquid smoke is mixed with 250 gms of propylene glycol and then boiled to evaporate down to one-fifth of its original volume, yielding a concentrated liquid smoke solution having a pH of 4.5.

EXAMPLE III

This example illustrates the preparation of a concentrated substantially neutralized liquid smoke composition.

1000 gms of "SMOKAROMA Code 10" (Meat Industry Suppliers Co.) liquid smoke is mixed with 250 gms of propylene glycol. To this solution is added 70 gms of sodium hydroxide. The substantially neutralized liquid smoke solution is then concentrated by evaporation in a low humidity environment to one-fifth of its original volume yielding a concentrated substantially neutralized liquid smoke solution with a pH of 6.2.

EXAMPLE IV

This example illustrates the preparation of an egg albumin solution.

An egg albumin solution is prepared by mixing together 600 grams of water, 400 gms of "Kraft Dried Egg Whites, Angel Type" (Kraft Foods Co.), 80 gms of a 50% mineral oil in water emulsion, and 110 gms of glycerine. The mineral oil is optionally added as an antiblock agent and the glycerine is optionally added as a plasticizer for the egg albumin coating.

EXAMPLE V

This example illustrates the treatment of food casing with egg albumin and substantially neutralized liquid smoke in a one-step method.

10.0 gms of the substantially neutralized liquid smoke of Example I is mixed with 4.0 gms of the egg albumin solution prepared in Example IV. The final mixture is then coated on the inside of a non-fibrous cellulosic casing having a water content of 30 wt% at a level of 70.0 mg of coating per sq. in. of casing surface. The coated casing is then dried to a water content of 12 wt% based on total weight.

EXAMPLE VI

This example illustrates the treatment of food casing with egg albumin and substantially neutralized liquid smoke in a two-step method.

The egg albumin solution of Example IV is coated on the inside surface of a non-fibrous cellulosic dry casing stock at a level of 12.0 mg/sq. in. of casing surface. The coated casing is then partially dried to 15 wt.% water. The inside surface of the casing is then coated additionally with the substantially neutralized liquid smoke of Example I at a level of 57.0 mg/sq. in. of casing surface and then dried to a water content of 12 wt.% based on total weight.

EXAMPLE VII

This example illustrates the treatment of food casing with egg albumin and concentrated liquid smoke in a one-step method.

20.0 gms of the concentrated liquid smoke of Example II is further mixed with 10.0 gms of propylene glycol and optionally mixed with 7.0 gms of a 50% mineral oil in water emulsion. To this is then added a mixture of 6.0 gms of fresh egg white mixture and 7.0 gms of glycerine. The final mixture is then coated on the inside of a non-fibrous cellulosic casing having a water content of 30 wt.% at a level of 10.0 mg of coating per sq. in. of casing surface. The coated casing is then dried to a water content of 12 wt.% based on total weight.

EXAMPLE VIII

This example illustrates the treatment of food casing with egg albumin and concentrated liquid smoke in a two-step method.

The egg albumin solution of Example IV is coated on the inside surface of a non-fibrous cellulosic dry casing stock at a level of 12.0 mg/sq. in. of casing surface. The coated casing is then partially dried to 15 wt.% water content.

100 gms of the concentrated liquid smoke of Example II is further mixed with 30 gms of water and 10 gms of a 50% mineral oil in water emulsion is optionally added as an antiblock agent. The final mixture is then coated onto the egg albumin coated surface of the casing, at a level of 15.0 mg/sq. in. of casing surface and then dried to a water content of 12 wt.% based on total weight.

EXAMPLE IX

This example illustrates the preparation of a smoke tars liquid smoke composition and the treatment of food

19 casing with egg albumin and smoke tars liquid smoke in a one-step method.

To 1000 gms of "SMOKAROMA Code 10" liquid smoke is added 70 gms of sodium hydroxide. The smoke tars precipitate which forms is separated by decanting off the supernatant liquid phase. From the precipitate 18.0 gms of the smoke tars are taken and are dissolved in 20.0 gms of propylene glycol yielding a smoke tars liquid smoke composition having a pH of 6.5. The resulting composition is then mixed with 4.2 gms of the egg albumin solution prepared as in Example IV and optionally mixed with 20.0 gms of a 50% mineral oil in water emulsion as an antiblock agent. The coating composition thus prepared is used to coat the inside surface of a nonfibrous cellulosic casing having a water content of 30 wt.% at a level of 20.0 mg of coating per sq. in. of casing surface. The coated casing is then dried to a water content of 12 wt.% based on total weight.

EXAMPLE X

This example illustrates the treatment of food casing with egg albumin and smoke tars liquid smoke in a two-step method.

A smoke tars solution is prepared having the following composition:

| | |
|---|---|
| Smoke tars | 18 gms |
| Propylene glycol | 20 gms |
| 50% mineral oil in water emulsion | 5 gms |
| water | 10 gms |

The egg albumin solution prepared as in Example IV is coated on the inside surface of a non-fibrous cellulosic dry casing stock at a level of 12.0 mg/sq. in. of casing surface. The coated casing is then partially dried to a 15 wt.% water content. The inside surface of the casing is then coated additionally with the above smoke tars solution at a level of 15.0 mg/sq. in. of casing surface. The coated casing is then dried to a water content of 12 wt.% based on total weight.

EXAMPLE XI

This example illustrates the treatment of food casing with egg albumin and concentrated substantially neutralized liquid smoke in a one-step method.

10 gms of the concentrated substantially neutralized liquid smoke of Example III is mixed with 30.0 gms of the egg albumin solution prepared as in Example IV and optionally mixed with 5.0 gms of a 50% mineral oil in water emulsion. The final mixture is then coated on the inside of a non-fibrous cellulosic casing having a water content of 30 wt.% at a level of 20.0 mg of coating per sq. in of casing surface. The coated casing is then dried to a water content of 12 wt.% based on total weight.

EXAMPLE XII

This example illustrates the treatment of food casing with egg albumin and concentrated substantially neutralized liquid smoke in a two-step method.

The egg albumin solution of Example IV is coated on the inside surface of a non-fibrous cellulosic dry casing stock at a level of 12.0 mg/sq. in of casing surface. The coated casing is then partially dried to a water content of 15 wt.%. The inside surface of the casing is then coated additionally with the concentrated substantially neutralized liquid smoke of Example III, which had been diluted by adding to 20.0 gms of this concentrated substantially neutralized liquid smoke 5.0 gms of a 50% mineral oil in water emulsion as an antiblock agent, at a level of 15.0 mg of coating per sq. in of casing surface and then dried to a water content of 12 wt.% based on total weight.

EXAMPLE XIII-XX

These examples illustrate the preparation of fibrous cellulosic casings by the methods of this invention.

The disclosures of Examples V-XII, respectively, apply in these examples except fibrous cellulosic casings are used in place of the non-fibrous cellulosic casings, and the coated casings are dried to a water content of 6 wt.% based on total weight in the last step of the examples.

EXAMPLES XXI-XXVIII

These examples illustrate the ability of the food casings treated in accordance with Examples V-XII, respectively, to impart smoke flavor and intensified smear-resistant smoke color to the surface of an encased processed meat product.

The non-fibrous cellulosic casings prepared as in Examples V-XII, respectively, are stuffed with frankfurter emulsion. The frankfurters are further processed by steps well-known in the art, but without a conventional smoking step. The casings are then peeled from the finished frankfurters revealing smoke flavored frankfurters with smear-resistant intensified smoke brown colored surfaces. Control samples stuffed in casings treated without egg albumin, but with "as is" liquid smoke and a water-soluble thickening agent and processed under similar conditions do not have the smear resistant intensified smoke color.

EXAMPLES XXIX-XXXVI

These examples illustrate the ability of the casings treated in accordance with Examples XIII-XX, respectively, to impart smoke flavor and intensified smear-resistant smoke color to the surface of an encased processed meat product.

The fibrous cellulosic casings prepared as in Examples XIII-XX, respectively, are stuffed with bologna emulsion.

The bolognas are further processed by steps well-known in the art but without a conventional smoking step. The casings are then peeled from the finished bolognas revealing smoke flavored bolognas with smear-resistant intensified smoke brown colored surfaces. Control samples stuffed in casings treated without egg albumin but with "as is" liquid smoke and a water-soluble thickening agent and processed under similar conditions do not have the smear-resistant intensified smoke color.

Although the present invention has been described and set forth in some detail, it should be further understood that the same is susceptible of changes, modifications and variations without departing from the scope and spirit of the invention.

What is claimed is:

1. A food casing comprising a casing having a coating over at least a portion of a surface thereof, said coating comprising an albumin and smoke flavoring and coloring constituents derived from a modified liquid smoke composition selected from the group consisting of:
   (a) a substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out;

(b) a concentrated liquid smoke which comprises an aqueous composition having a pH greater than about 4, comprising a uniform mixture of smoke coloring and flavoring constituents derived from a liquid smoke solution, and an amount of a water soluble alcohol solubilizing agent sufficient to prevent said smoke constituents from separating out, and wherein said composition comprises greater than about 15% by weight of said smoke constituents;

(c) a concentrated substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out, and wherein said composition comprises greater than about 15% by weight of said smoke constituents; and (d) a smoke tars liquid smoke which comprises a composition having a pH greater than about 4, comprising a uniform mixture of smoke coloring and flavoring constituents derived from smoke tars, and an amount of a water soluble alcohol solubilizing agent sufficient to prevent said smoke constituents from separating out, and wherein said composition comprises greater than about 15% by weight of said smoke constituents;

said casing being suitable for imparting smoke flavor and smear resistant intensified smoke color to the surface of a food product processed therein.

2. The casing of claim 1 wherein said casing is a tubular food casing.

3. The casing of claim 2 wherein said surface is an internal surface of said casing.

4. The casing of claim 3 wherein the casing is a cellulosic casing.

5. The casing of claim 4 wherein the casing is fiber reinforced.

6. The casing of claim 3 wherein the casing is a collagen casing.

7. The casing of claim 3 wherein the casing is a polyvinyl alcohol casing.

8. The casing of claim 7 wherein the casing is fiber reinforced.

9. The casing of claim 3 wherein said albumin is an egg albumin.

10. The casing of claim 3 wherein said albumin is present in an amount of at least about 1.5 mgs. per square inch of casing internal surface.

11. The casing of claim 3 wherein said smoke flavoring and coloring constituents are present in an amount of at least about 0.5 mgs. per sq. in of casing internal surface.

12. The casing of claim 11 wherein said albumin is present in an amount of at least about 1.5 mgs. per sq. in of casing internal surface.

13. The casing of claim 12 wherein said coating comprises an admixture of an egg albumin and said smoke flavoring and coloring constituents derived from said modified liquid smoke composition.

14. The casing of claim 12 wherein said coating comprises a first layer of an egg albumin and a second layer of said smoke flavoring and coloring constituents derived from said modified liquid smoke composition.

15. The casing of claim 12 wherein said coating additionally comprises an antiblock agent.

16. The casing of claim 12 wherein a food product is encased therein.

17. The casing of claim 1 wherein said coating comprises an albumin and an admixture of said smoke coloring and flavoring constituents derived from said substantially neutralized liquid smoke in an amount of at least about 0.5 mg of said smoke constituents per square inch of casing surface, a salt of an alkaline neutralizing agent, and a water soluble alcohol solubilizing agent for said smoke constituents, wherein said coating has a pH greater than about 4.

18. The casing of claim 1 wherein said coating comprises an albumin and an admixture of said smoke coloring and flavoring constituents derived from said concentrated substantially neutralized liquid smoke in an amount of at least about 0.5 mg. of said smoke constituents per square inch of casing surface, a salt of an alkaline neutralizing agent, and a water soluble alcohol solubilizing agent for said smoke constituents, wherein said coating has a pH greater than about 4.

19. The casing of claim 1 wherein said coating comprises an albumin and an admixture of said smoke coloring and flavoring constituents derived from said concentrated liquid smoke in an amount of at least about 0.5 mg of said smoke constituents per square inch of casing surface, and a water soluble alcohol solubilizing agent for said smoke constituents, wherein said coating has a pH greater than about 4.

20. The casing of claim 1 wherein said coating comprises an albumin and an admixture of said smoke coloring and flavoring constituents derived from said smoke tars liquid smoke in an amount of at least about 0.5 mg of said smoke constituents per square inch of casing surface, and a water soluble alcohol solubilizing agent for said smoke constituents, wherein said coating has a pH greater than about 4.

21. The food casing of claim 1 wherein said coating additionally comprises a cellulose ether.

22. The food casing of claim 21 wherein said cellulose ether is carboxymethyl cellulose.

23. The food casing of claim 12 wherein said coating additionally comprises mineral oil.

24. In a method for manufacturing a food casing, the improvement which comprises at least a portion of a surface of a casing with an albumin, and smoke flavoring and coloring constituents in the form of a modified liquid smoke composition selected from the group consisting of:

(a) a substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out;

(b) a concentrated liquid smoke which comprises an aqueous composition having a pH greater than about 4, comprising a uniform mixture of smoke coloring and flavoring constituents derived from a liquid smoke solution, and an amount of a water soluble alcohol solubilizing agent sufficient to prevent said smoke constituents from separating out, and wherein said composition comprises greater than about 15% by weight of said smoke constituents;

(c) a concentrated substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out, and wherein said composition comprises greater than about 15% by weight of said smoke constituents; and (d) a smoke tar liquid smoke which comprises a composition having a pH greater than about 4, comprising a uniform mixture of smoke coloring and flavoring constituents derived from smoke tars, and an amount of a water soluble alcohol solubilizing agent sufficient to prevent said smoke constituents from separating out, and wherein said composition comprises greater than about 15% by weight of said smoke constituents;

said casing being suitable for imparting smoke flavor and smear resistant intensified smoke color to the surface of a good product processed therein.

25. The method of claim 24 wherein said casing is a tubular food casing.

26. The method of claim 25 wherein said surface is an internal surface of said casing.

27. The method of claim 26 wherein the casing is a cellulosic casing.

28. The method of claim 27 wherein the casing is fiber reinforced.

29. The method of claim 26 wherein the casing is a collagen casing.

30. The method of claim 26 wherein the casing is a polyvinyl alcohol casing.

31. The method of claim 30 wherein the casing is fiber reinforced.

32. The method of claim 26 wherein said albumin is an egg albumin.

33. The method of claim 26 wherein said albumin is coated on said surface of said casing in an amount of at least about 1.5 mgs. per square inch of casing surface.

34. The method of claim 26 wherein the casing is coated by slugging.

35. The method of claim 26 wherein the casing is coated by spraying.

36. The method of claim 26 wherein said smoke flavoring and coloring constituents are coated on said surface of said casing in an amount of at least about 0.5 mgs. per square inch of casing surface.

37. The method of claim 36 wherein said albumin is coated on said surface of said casing in an amount of at least about 1.5 mgs. per square inch of casing surface.

38. The method of claim 37 wherein said albumin is an egg albumin.

39. The method of claim 38 wherein an antiblock agent is additionally coated on said surface of said casing.

40. The method of claim 38 wherein said egg albumin and said smoke flavoring and coloring constituents in the form of a modified liquid smoke composition are coated on said surface of said casing in the form of an admixture comprising said egg albumin and said modified liquid smoke composition.

41. The method of claim 38 wherein said egg albumin is coated in a first layer on said surface of said casing, and said smoke flavoring and coloring constituents in the form of a modified liquid smoke composition are coated in a second layer on said surface of said casing coated with said first layer.

42. The method of claim 40 wherein said casing is dried after coating.

43. The method of claim 41 wherein said casing is dried after coating with said first layer, but before coating with said second layer.

44. The method of claim 41 wherein said casing is dried after coating with said second layer.

45. The method of claim 21 wherein said modified liquid smoke composition additionally comprises a cellulose ether.

46. The method of claim 45 wherein said cellulose ether is carboxymethyl cellulose.

47. The method of claim 38 wherein mineral oil is additionally coated on said surface of said casing.

48. A coating composition comprising an admixture of an albumin and a modified liquid smoke composition selected from the group consisting of:

(a) a substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out;

(b) a concentrated liquid smoke which comprises an aqueous composition having a pH greater than about 4, comprising a uniform mixture of smoke coloring and flavoring constituents derived from a liquid smoke solution, and an amount of a water soluble alcohol solubilizing agent sufficient to prevent said smoke constituents from separating out, and wherein said composition comprises greater than about 15% by weight of said smoke constituents;

(c) a concentrated substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out, and wherein said composition comprises greater than about 15% by weight of said smoke constituents; and (d) a smoke tars liquid smoke which comprises a composition having a pH greater than about 4, comprising a uniform mixture of smoke coloring and flavoring constituents derived from smoke tars, and an amount of a water soluble alcohol solubilizing agent sufficient to prevent said smoke constituents from separating out, and wherein said composition comprises greater than about 15% by weight of said smoke constituents;

said composition being suitable for preparing a food casing suitable for imparting smoke flavor and smear resistant intensified smoke color to the surface of a food product processed therein.

49. The coating composition of claim 46 wherein said coating composition additionally comprises a cellulose ether.

50. The coating composition of claim 49 wherein said cellulose ether is carboxymethyl cellulose.

51. A meat sausage having a smear resistant surface coating comprising egg albumin and smoke flavoring and coloring constituents derived from a modified liquid smoke composition selected from the group consisting of:

(a) a substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out;

(b) a concentrated liquid smoke which comprises an aqueous composition having a pH greater than about 4, comprising a uniform mixture of smoke coloring and flavoring constituents derived from a liquid smoke solution, and an amount of a water soluble alcohol solubilizing agent sufficient to prevent said smoke constituents from separating out, and wherein said composition comprises greater than about 15% by weight of said smoke constituents;

(c) a concentrated substantially neutralized liquid smoke which comprises an aqueous composition having a pH greater than about 4, comprising a uniform mixture of smoke coloring and flavoring constituents derived from a liquid smoke solution, a salt of an alkaline neutralizing agent, and an amount of a water soluble alcohol solubilizing agent sufficient to prevent said smoke constituents from separating out, and wherein said composition comprises greater than about 15% by weight of said smoke constituents; and (d) a smoke tars liquid smoke which comprises a composition having a pH greater than about 4, comprising a uniform mixture of smoke coloring and flavoring constituents derived from smoke tars, and an amount of a water soluble alcohol solubilizing agent sufficient to prevent said smoke constituents from separating out, and wherein said composition comprises greater than about 15% by weight of said smoke constituents.

* * * * *